United States Patent [19]

Nielson et al.

[11] 4,268,721

[45] May 19, 1981

[54] PORTABLE TELEPHONE COMMUNICATION DEVICE FOR THE HEARING IMPAIRED

[75] Inventors: Donald L. Nielson; David J. Fylstra; Roy H. Stehle, all of Palo Alto, Calif.

[73] Assignee: SRI International, Menlo Park, Calif.

[21] Appl. No.: 792,761

[22] Filed: May 2, 1977

[51] Int. Cl.³ .................... H04M 1/21; H04M 11/00
[52] U.S. Cl. .................. 179/2 C; 179/2 DP
[58] Field of Search .................. 179/1 C, 2 C

[56] References Cited

U.S. PATENT DOCUMENTS

| | | | |
|---|---|---|---|
| 2,501,955 | 3/1950 | McWane | 179/1 C |
| 3,130,270 | 4/1964 | Sanders | 179/1 C |
| 3,976,840 | 8/1976 | Cleveland et al. | 179/2 DP |
| 4,007,443 | 2/1977 | Bromberg et al. | 179/2 DP |
| 4,012,599 | 3/1977 | Meyer | 179/2 DP |
| 4,028,661 | 6/1977 | Mortimer | 340/324 M |

FOREIGN PATENT DOCUMENTS 1013279  7/1952  France ................. 179/1 C

*Primary Examiner*—George G. Stellar
*Attorney, Agent, or Firm*—Freilich, Hornbaker, Wasserman, Rosen & Fernandez

[57] ABSTRACT

A portable telephone communications device for the hearing impaired can be carried in the pocket of the user and attaches directly to the telephone handset without intrusion. It includes a keyboard and a readout which enables the user to transmit data by means of the keyboard and receive data which is presented on either an electronic display or a printer or both.

2 Claims, 6 Drawing Figures

PORTABLE TELEPHONE COMMUNICATION DEVICE FOR THE HEARING IMPAIRED

BACKGROUND OF THE INVENTION

This invention relates to telephone communication systems and more particularly to systems including a keyboard and a display device which can communicate by way of a telephone line.

Devices whereby the individuals having hearing impairment can use voice grade telephone lines are in existence. The teletypewriter is one such system. Another such system is described in a U.S. Pat. No. 3,746,793 wherein a keyboard entry terminal generates character codes which are transmitted to voice grade telephone lines through an acoustic coupler with the telephone receiver cradled thereon. An ordinary television receiver is connected to the terminal to display the operator's message as it is typed. At the receiving terminal, an acoustic coupler is used and the signals received are decoded and displayed on a television receiver.

In another U.S. Pat. No. 3,896,267, there is described a system similar to the one in U.S. Pat. No. 3,746,793 wherein a switch is used for determining whether the diode matrix will encode keyboard entrys in BAUDOT or ASCII codes.

The basic drawback to the systems described in these patents and other similar such systems, is that they are expensive and they are not portable. While the desire for the hearing impaired to communicate over a telephone may be sufficiently great so that the expense of a system, which includes a teletypewriter or a television receiver, is not the real deterrent, the fact remains that with the prior art systems, the hearing impaired can only make and receive telephone calls at the location of the equipment which is fixed because of size and weight. It should be apparent that this constitutes a definite restriction on the ability of the hearing impaired to travel. Also, if help is required and the individual is at the location of a telephone which is not equipped with the indicated system, he could not use a telephone to obtain assistance.

OBJECTS AND SUMMARY OF THE INVENTION

An object of this invention is to provide a truly portable communication device to enable a deaf person to communicate over the telephone system with other people whether or not they have a hearing impairment who are equipped with a similar or otherwise compatible device.

Another object of this invention is to provide a portable communication device to enable people with hearing impairment to communicate with others over the telephone with a system that is relatively inexpensive, when compared with the cost of the presently known devices for achieving a similar function.

The foregoing and other objects of the invention may be achieved in one arrangement wherein the invention comprises two containers hingeably connected together. They are sized so that one of the containers, which attaches by a means such as, a muff, to the transmitter portion of the telephone receiver will have a keyboard which connects to internal circuitry, and serves to generate either ASCII or BAUDOT code represenative of the Alphanumeric information set forth on the keys of the keyboard, and converts these signals to audio signal which are transmitted over the telephone. The other container attaches by a muff to the receiver portion of the telephone receiver and contains an Alphanumeric display device plus the circuitry necessary to convert the acoustical signals received into Alphanumeric signals which are then displayed on the display device. If desired, it may also contain a printer.

In another embodiment of the invention, a single container is provided which contains all of the previously indicated hardware. If desired it may also contain a printer. This single container is coupled by means of a muff to the telephone transmitter. It is inductively coupled to the receiver portion of the telephone. It fits underneath the receiver portion of the telephone and extends to the transmitter portion.

Both embodiments of the invention are lightweight and may be easily carried in a pocket.

DESCRIPTION OF THE PREFERRED EMBODIMENTS

Figure 1:
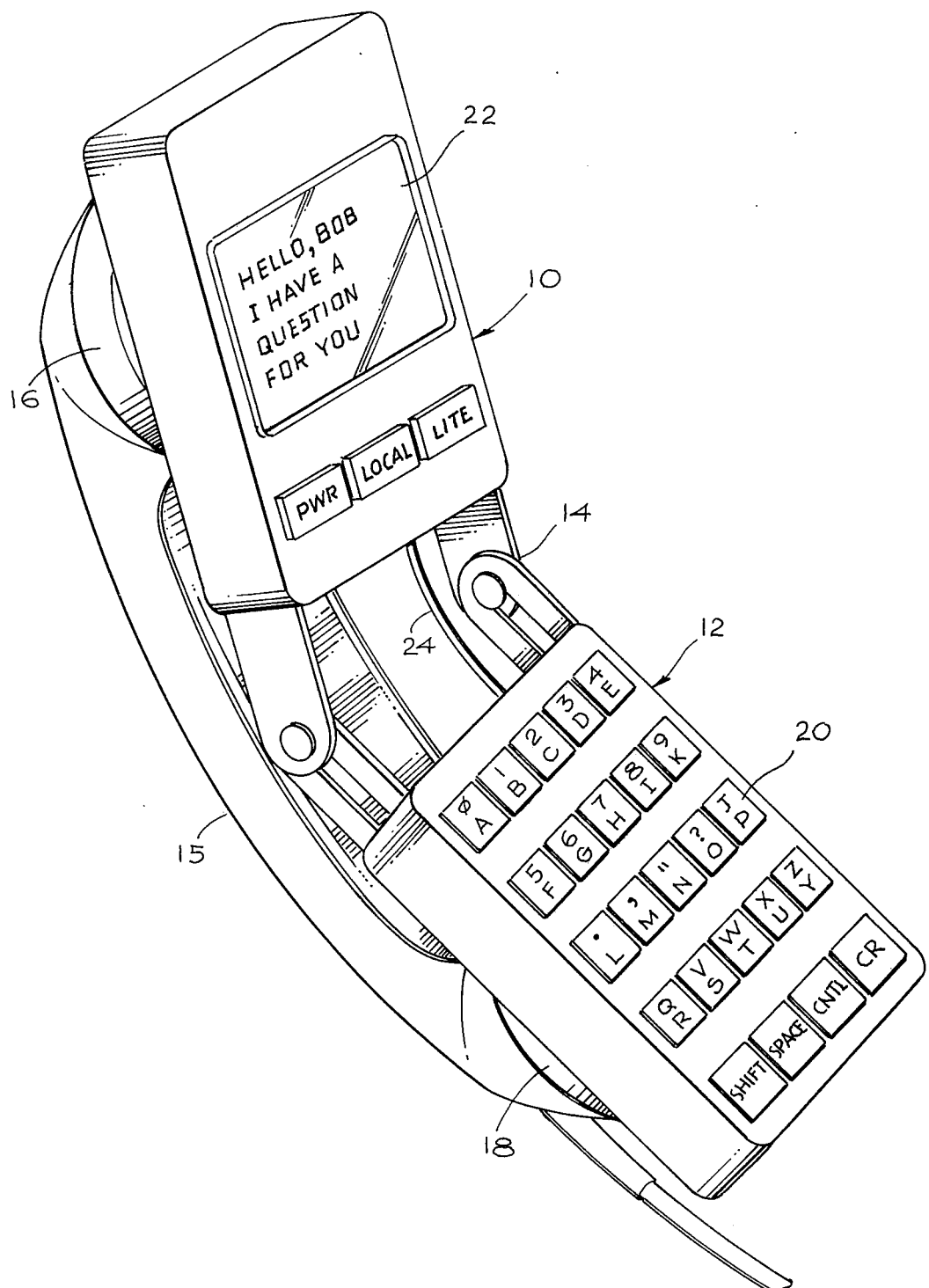
FIG. 1 is a perspective drawing illustrating the appearance of one embodiment of the invention.

One configuration for an embodiment of the invention is shown in FIG. 1. The circuits and associated equipment are carried in two containers respectively 10, 12, which are coupled to one another by means of a hinge 14 plus the necessary electronic cabling 24. The hinge is an adjustable one to enable the respective containers 10, 12 to extent until each container can have coupling means such as a muff respectively 16, 18 fit over the respective receiver and transmitter ends of the telephone handset 15.

The container, which couples to the telephone transmitter, has a keyboard 20, which comprises a set of keys wherein the depression of a key or sequence of key depressions will generate signals representative of the indicia associated with the keys. The container 12 will hold the circuits required for generating signals representative of the information on each key which has been depressed, as well as other circuits which convert these signals into code signals suitable for transmission over an acoustic telephone line.

The container 10 will hold an Alphanumeric display device, 22, which may be for example, one of the presently used liquid crystal display devices (LCD) which are low in power consumption. The container 10 will also include the hardware required for receiving acoustical signals over the telephone and for converting these signals into a suitable form to actuate the circuitry used for the display device. Alternatively, all of the decoding circuitry may be contained in the lower container with circuits in the two containers being connected by suitable electronic cabling 24.

The transmitted or received symbols may be displayed either on electronic displays as suggested, or through the use of low power printing devices, or a combination of the two.

The entire device is battery operated and thanks to large scale integration technology, uses a very small amount of power. Self-contained rechargeable batteries may be used if desired. Under normal use one can hold the telephone handset in one hand and type with the other. Under other conditions, a suitable cradle could allow the device to rest on a flat surface allowing operation with one hand.

Figure 2:
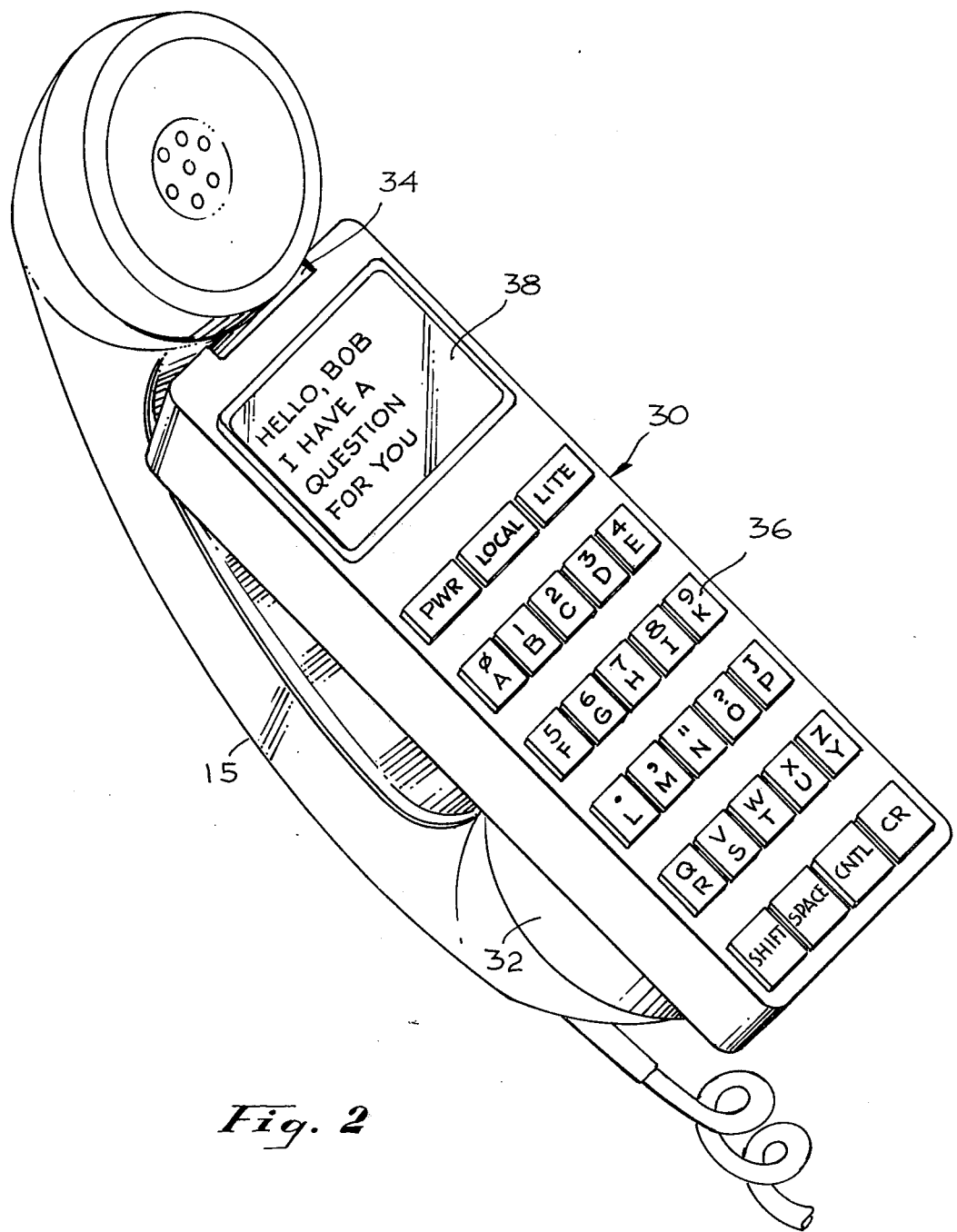
FIG. 2 is perspective drawing illustrating the appearance of another embodiment of the invention.

In FIG. 2, there is shown another arrangement for an embodiment of this invention. Here, the entire device is within a single container 30. This container has a muff 32 that couples to the transmitter of the telephone. Instead of a second muff coupled to the telephone receiver, a spring loaded pad with an inductive pickup device 34 is placed at the top end of the container 30. The keyboard 36 and the display device 38, are the same as is shown in FIG. 1. In use again, the telephone handset is held in one hand and the user can apply a finger of the other hand to the keyboard.

Figure 3:
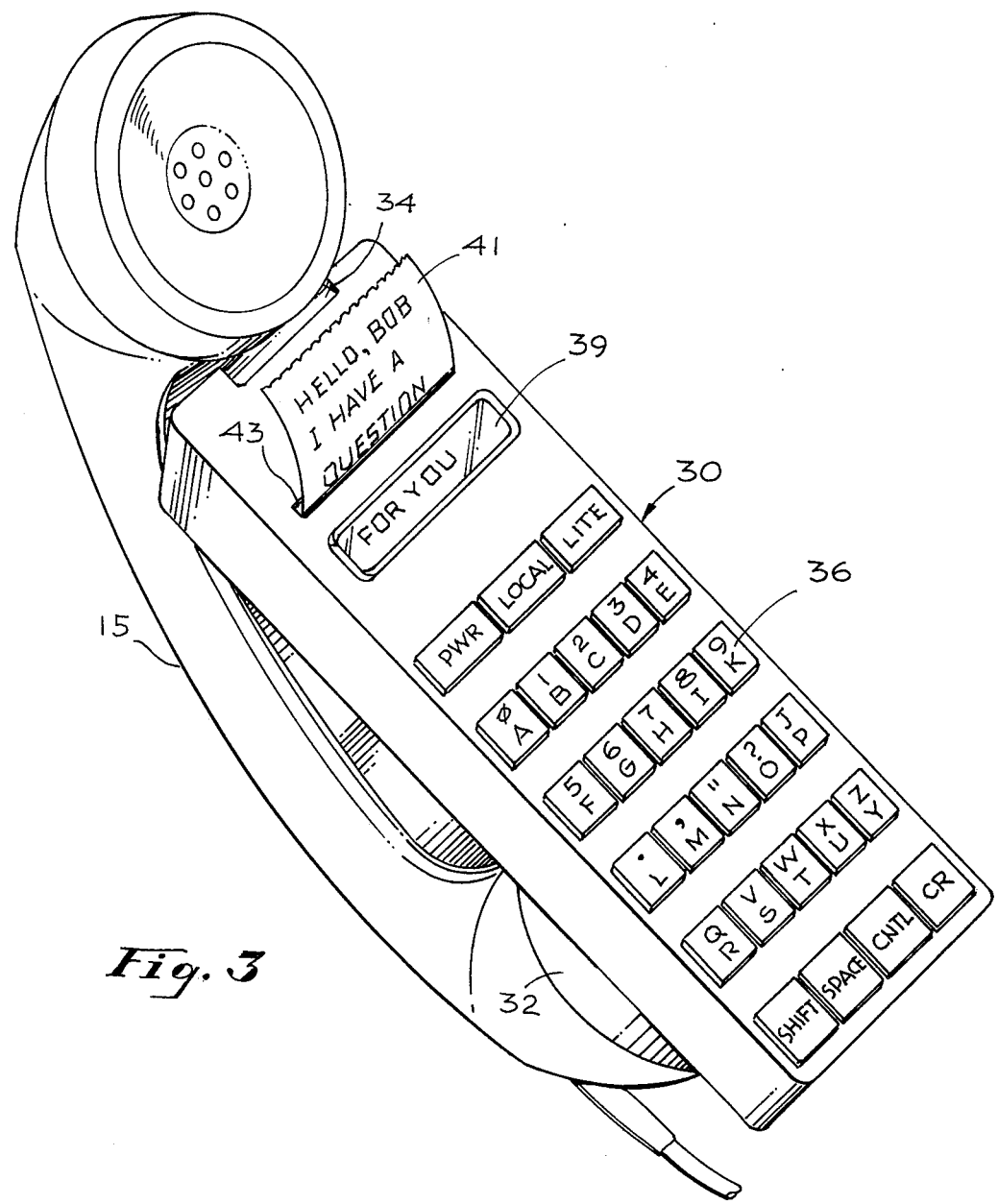
FIG. 3 is a perspective drawing of the embodiment of the invention shown in FIG. 2 with the addition of a printer.

FIG. 3 shows the appearance of the embodiment of the invention shown in FIG. 2 which has been modified by the addition of a printer. The LCD display 39 may be a one line display. A low power printing device is included and the printout 41 is shown being emitted from a slot 43 in the container.

Figures 4A, 4B:
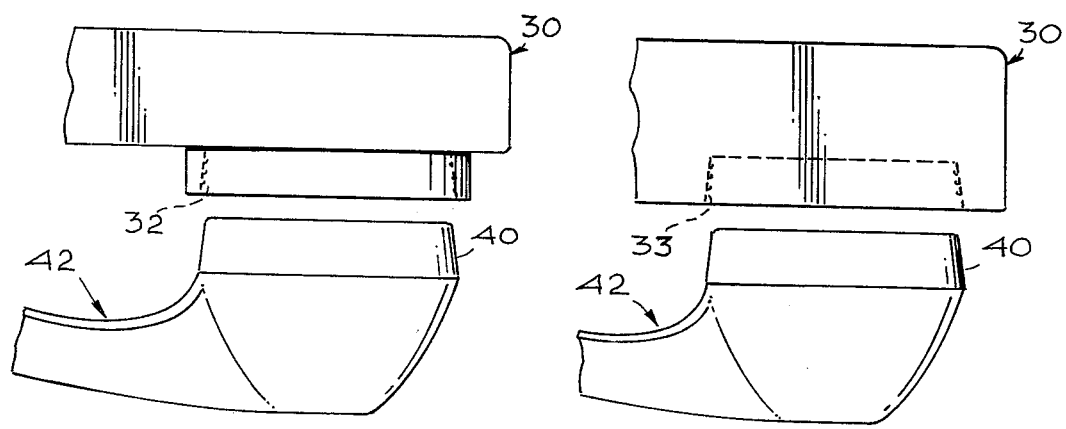
FIGS. 4A and 4B are sectional drawings illustrating acoustic coupling arrangements which may be used.

FIG. 4A is a sectional drawing illustrating the acoustical coupling technique which may be used for coupling to the telephone receiver and transmitter. The container, for example, 30, has a hollow cylindrical receptor, or muff, 32 extending therefrom, which may be made of plastic or rubber. This receptor is just large enough to fit over the transmitter or receiver end 40 of a telephone handset 42.

FIG. 4B is a sectional drawing of an alternative arrangement for the acoustical coupling technique wherein the container 30 has a cylindrical aperture which may be lined with rubber or plastic and which fits over the receiver or transmitter end of the telephone receiver.

Figure 5:
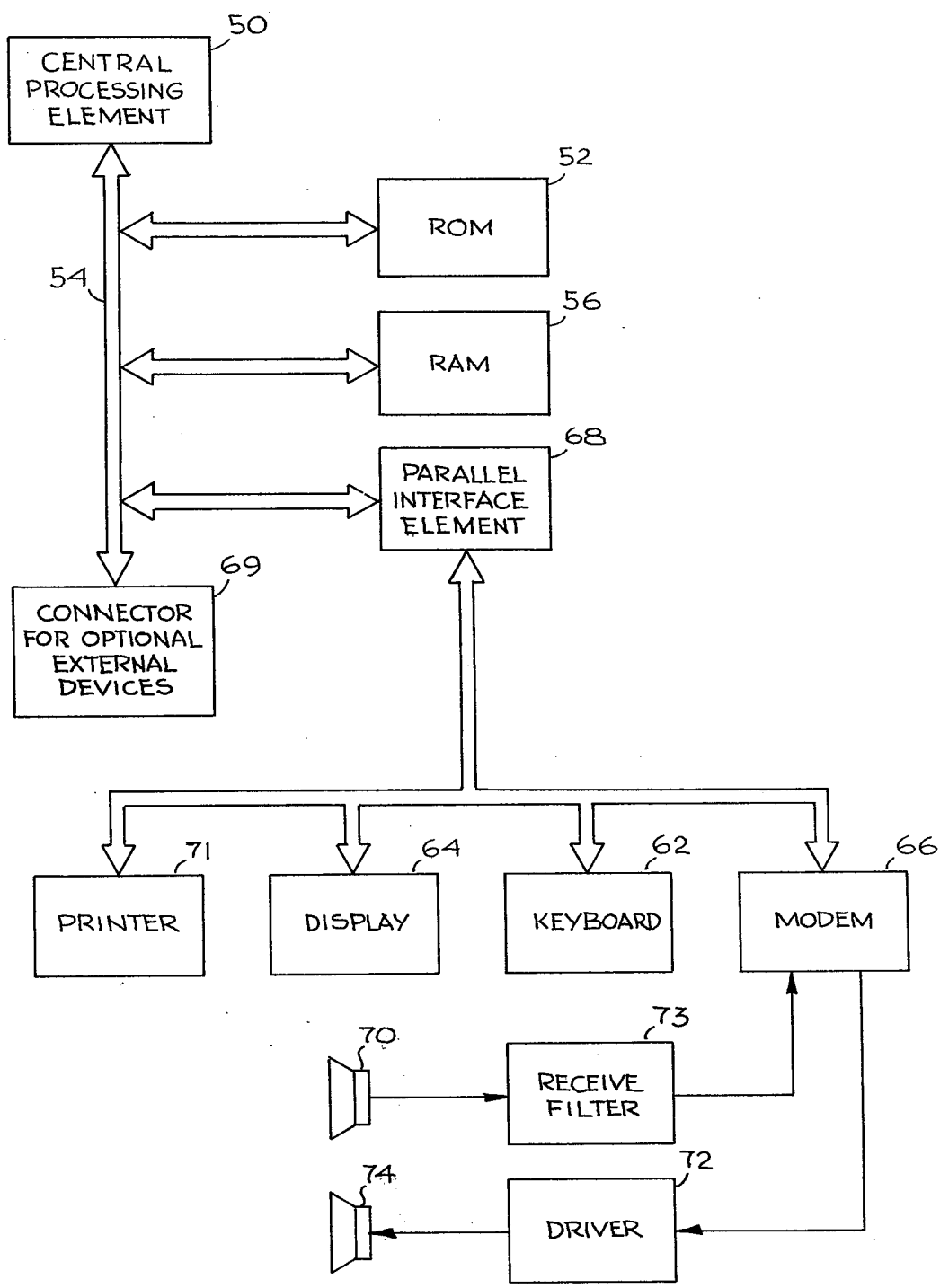
FIG. 5 is a schematic block diagram illustrative of the circuits which may be used.

The specific circuitry which is to be included in the containers shown in FIGS. 1, 2 and 3 can comprise well known circuits which, as illustrated, in the patents which have been cited, previously perform the functions required for both responding to a keyboard to provide signals for transmission over an acoustical telephone line, or producing, in response to received signals over an acoustical telephone line, a display which can be easily read. However, these circuits must be reduced, using large scale integration techniques, into a size which whereby they can fit into the containers shown in FIGS. 1, 2 and 3. One such arrangement is shown in FIG. 5. A central processing element 50, comprises a chip. which is designated by the Intersil Company as their IM6100. It comes from their microprocessor family of chips and requires only microwatts of power. This chip has the internal architecture of Digital Equipment Corporation's PDP-8. This is a thoroughly understood field tested computer system with excellent software support. This chip controls the scanning of the keyboard, the displaying or printing of characters, and the operation of the system. A program for operating the central processing unit is stored on one or more chips 52 designated as ROM (read only memory). This chip also is made by the Intersil Company and is sold as their IM6312. A bus 54 serves to interconnect the central processor unit with the read only memory 52, read/write, random access memory, designated as RAM 56, a parallel interface element 68, peripheral circuits, and an interface connector to optional external devices 69.

Signals, which when applied to the liquid crystal display device 64 cause it to display a corresponding Alphanumeric representation, are converted from patterns stored in the ROM 52 from codes stored in the RAM 56. The storage capacity will, in general, exceed the capacity of the display allowing for the recall of stored information for review or store-and-forward applications. This RAM may also be purchased from Intersil and is designated as the IM6561. This memory is connected to the bus. These signals may be delivered to a low power printing assembly 71 either instead of or in addition to the electronic display.

The external devices, which comprise the keyboard 62, display device 64, and modem 66, all interface with the central processing element 50, through a single chip designated as the parallel interface element 68. The parallel interface element is also purchasable from Intersil and is designated as the IM6101. The LCD is purchasable from the Applied Technology Division of Itek as their LCD-100. The printer 71 may be used instead of, or in addition to the display. Such printers are available from manufacturers such as Sharp, Hycom and Olivetti. The keyboard is of the type purchasable from manufacturers such as Texas Instruments and Bowmar. These keyboards are used on small calculators.

The modem 66 actually consists of two chips. One of these is made by the Motorola Company and it is their Modem Chip MC14412VL. The other is a receiver filter 73, purchasable from Cermetek and designated as their CH1257. The receiver filter is driven by electrical signals which are the output from a receiver transducer 70, which receives acoustical or inductive signals from the telephone receiver and converts these into electrical signals. The modem is responsible for both sending and receiving tone bursts, which represent characters, across the phone lines. Thus the tone bursts received by transducer 70 are converted into electrical signals consisting of signals modulated on a carrier. These signals are applied to the receiver filter 73 which removes the noise signals and then applies the result to the modem which demodulates the carrier and provides the demodulated signals to the parallel interface element 68.

The modem also modulates signals which are generated in response to the keyboard being actuated and then applies the modulated signals to a driver 72. The driver applies the signals to a transducer 74 which converts the electrical signals into acoustical tone bursts which can be transmitted. Piezoelectric transducers are available which can convert the electrical signals into acoustical signals.

The program stored in the ROM 52 performs several functions in an infinitely repeating sequence. It periodically scans the keyboard to look for depressed keys. It performs the debouncing function and decoding upshift, down-shift functions.

The program handles the conversion between an internal coded representation of the selected keyboard character and ASCII, BAUDOT, or other standard communication codes. It directs the formatting of these communication codes into a standard bit frame by adding start, stop and parity bits and sending each frame serially out to the modem. The program also controls listening to the modem received channel and reconstructs individual characters. Next the program causes the shifting of the receiving transmitted characters in and out of the character buffer which the RAM 56 provides. Finally, the program can send the current contents of this buffer out to be displayed on the Alphanumeric LCD screen or printer. Such programming is well understood by those skilled in the art.

In addition the program performs incidental housekeeping functions, such as setting the modem in orginate or answer mode; detecting low battery conditions, controlling baud rate, and reading the user's name and address onto the screen or printer during every power up, as protection in case the device should be lost.

The foregoing should be considered as exemplary and not restrictive. The operations described, of the components, and their interconnections recited are all well known, and their use and interconnection for the purposes designated are also well known to those skilled in the art. The basic function performed, which is converting a keyboard input into signals which can be transmitted over an acoustical telephone line and received at a terminal which converts these signals back into a human language display, are the same as those shown and described, for example, in the patents previously referred to herein. It derives its uniqueness from the manner of attachment to the telephone handset rather than having the handset mounted to a much larger device.

It should be appreciated that the telephone handset to which the invention couples, may be connected to the input to a computer, whereby this invention can communicate with a computer in the same manner as a terminal remotely located from a computer communicates with the computer over a telephone device. Also, this invention may be used to receive and store and display messages, without an individual being in attendance when the message is received.

Accordingly, there has been shown and described herein, a novel and useful arrangement for permitting a deaf person to talk with any other person having a compatible device, anywhere in the country from any telephone. The device is compact, portable and relatively inexpensive.

We claim:
1. A telephone communication terminal for enabling the use of a conventional telephone for communication with the hearing impaired, comprising:
   a portable container means,
   means for attaching said container means to a telephone handset to be supported thereby including acoustical coupling means at one surface of said container, for removably coupling to said telephone handset,
   said container means including a keyboard with a complete set of alphanumeric characters for use to generate signals representing any complete selected message of alphanumeric characters,
   circuit means within said container means responsive to actuation of said keyboard to generate signals responsive thereto suitable for transmittal through said acoustical coupling means over an acoustical telephone line,
   pickup means within said container means responsive to acoustical signals received from said telephone handset to generate signals related thereto,
   a display device,
   control means including modem means adopted to simultaneously control the transmittal of the signals generated by said circuit means through said acoustical coupling means over the acoustical telephone line, and to respond to the signals generated by said pickup means, said control means include means to activate said display means to provide a display of alphanumeric characters related to the acoustical signals received from said telephone handset, and said container means comprises two separate parts, a first part including a first acoustical coupling means for coupling to the transmitter of a telephone handset, a second part including a second acoustical coupling means for coupling to the receiver of said telephone handset, and extensible hinge means coupling said first and second parts together, whereby said two parts are substantially foldable on one another.

2. A system as recited in claim 1 wherein said first acoustical coupling means comprises a hollow cylinder having an internal diameter to releasably fit over the receiver portion of said telephone handset, and
   said second acoustical coupling means includes a hollow cylinder having an internal diameter to releasably fit over the transmitter portion of said telephone handset.

* * * * *